Figure 4:
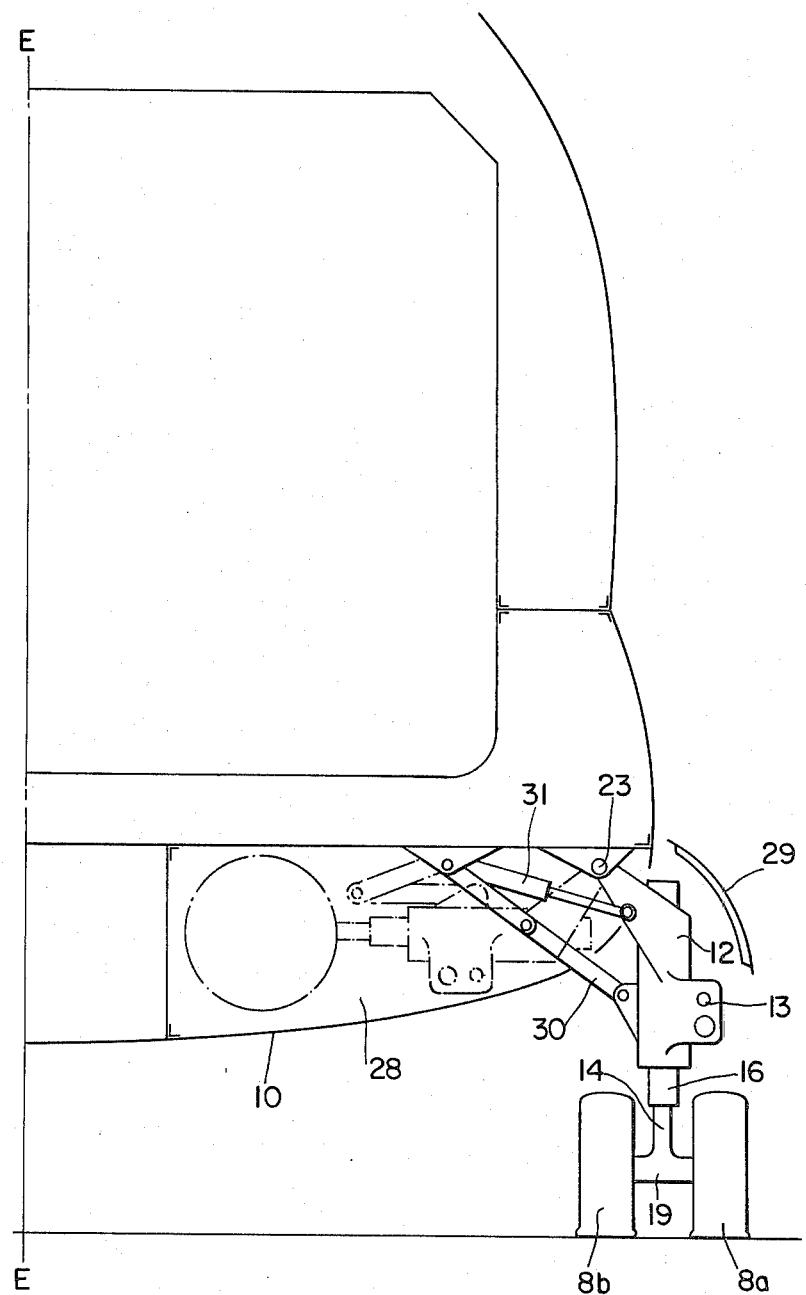

United States Patent [19]

Dornier, Jr. et al.

[11] 4,406,432
[45] Sep. 27, 1983

[54] RETRACTABLE LANDING GEAR FOR JUMBO AIRCRAFT

[76] Inventors: Claudius Dornier, Jr., Gustav-Werner-Weg; Heinz Günter, Gaggstrasse 11, both of 7990 Friedrichshafen 1; Hubert Krojer, Hebelstrasse 3, 7775 Bermatingen; Johannes Spintzyk, Rebhalde 4/2, 7990 Friedrichshafen 24, all of Fed. Rep. of Germany

[21] Appl. No.: 138,994

[22] Filed: Apr. 10, 1980

[30] Foreign Application Priority Data

Jun. 20, 1979 [DE] Fed. Rep. of Germany ....... 2924741

[51] Int. Cl.³ .............................................. B64C 25/12
[52] U.S. Cl. .............................................. 244/102 R
[58] Field of Search ...................... 244/100 R, 102 R; D12/343, 345

[56] References Cited

U.S. PATENT DOCUMENTS

| | | | |
|---|---|---|---|
| D. 202,749 | 11/1965 | Holtby et al. | 244/102 R UX |
| 2,747,817 | 5/1956 | Saulnier | 244/102 R |
| 2,777,652 | 1/1957 | Grudin | 244/102 R |
| 2,974,909 | 3/1961 | Perdue | 244/102 R |
| 3,323,761 | 6/1967 | Copeland | 244/102 R |

*Primary Examiner*—Galen L. Barefoot
*Attorney, Agent, or Firm*—James E. Bryan

[57] ABSTRACT

This invention relates to an improvement in a retractable landing gear for jumbo aircraft, in particular of the high-wing monoplane design, with a number of steerable landing units which are retractable into wells in the aircraft fuselage, the improvement comprising (a) means mounting a plurality of landing gear unit means which are spread into two or more rows that extend predominantly over a range at the aircraft fuselage running in the aircraft longitudinal direction, (b) said landing gear unit means and frames belonging to the airframe structure being designed in the manner of a grid division in which, between two particular unencroached main frames of the structure, a particular landing gear unit of one row is arranged and including means to retract it into well means between the frames, and (c) all landing gear units being made of identical components and being of the same dimensions.

1 Claim, 6 Drawing Figures

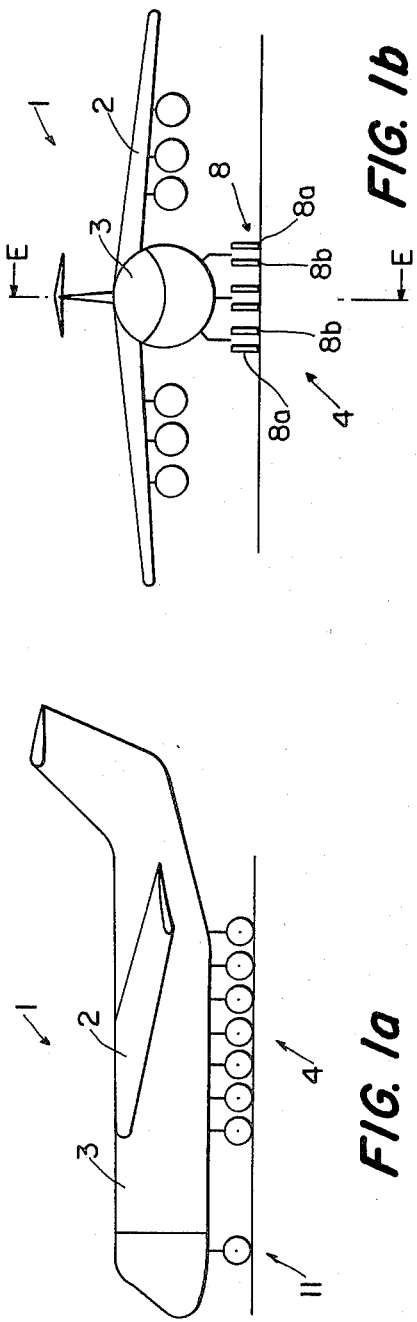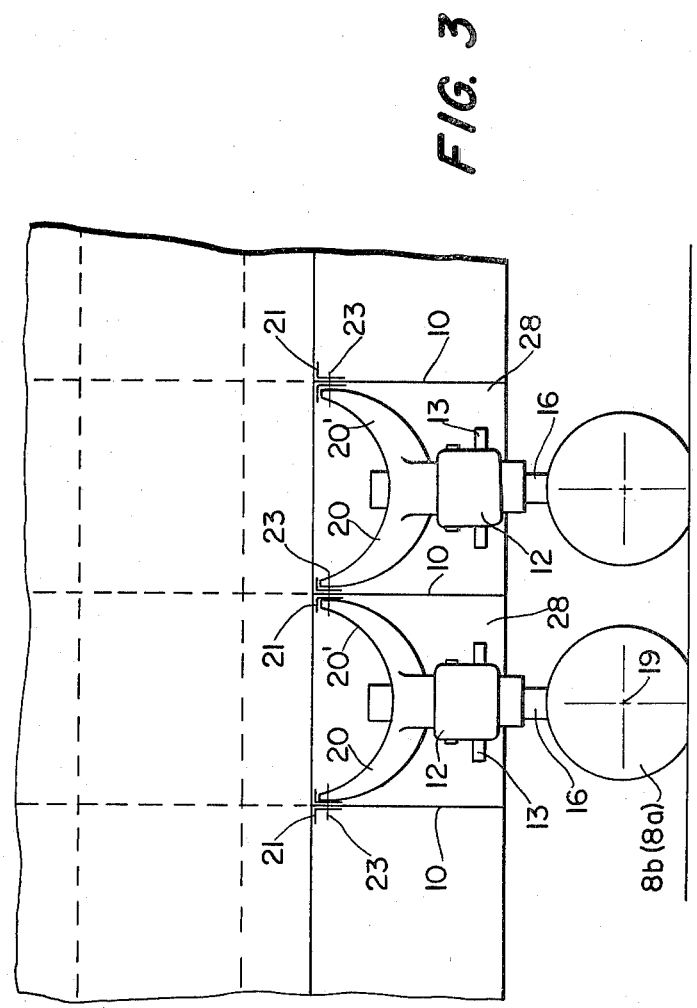

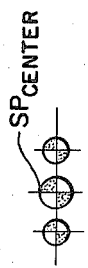
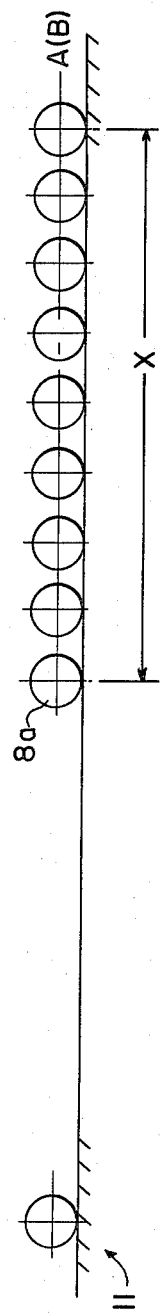
FIG. 2a
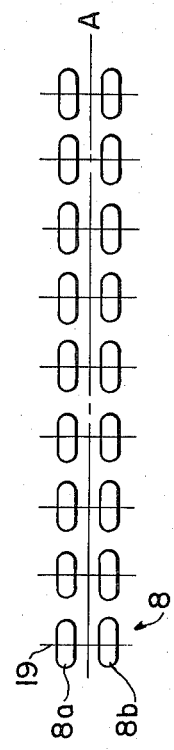
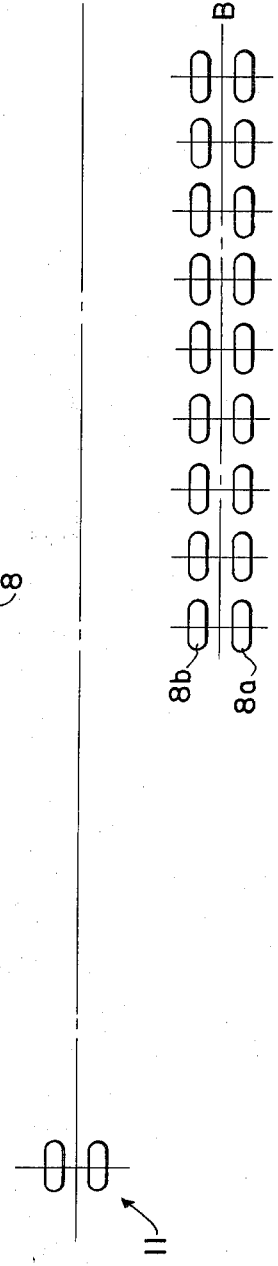
FIG. 2b

RETRACTABLE LANDING GEAR FOR JUMBO AIRCRAFT

The invention relates to retractable landing gears for jumbo aircraft, in particular aircraft of the high-wing monoplane design, including a number of landing gear units which can be steered and retracted into wells of the aircraft fuselage.

Regarding aircraft of the aforementioned type which are larger or heavier than average, problems arise when designing the landing gear, which on one hand reside in storing the landing gear in the retracted position in wells of the aircraft frame and on the other in the transfer of the loads thus occurring into the aircraft frame. This entails strength requirements regarding the forces which must be absorbed by the frame structure when the aircraft rolls on the ground. Special criteria furthermore apply for landing gears with a large number of wheels or landing gear units when negotiating curves while taxiing.

Retractable landing gear systems are known which include three or more landing gear wheels or dual wheels at each landing gear leg. The landing gears are arranged in several rows, generally rows of sets of two, which are arranged across a relatively large area in the direction of the aircraft transverse axis. The retraction of landing gears so designed into wells within the fuselage and the support wing inevitably entails an encroachment on the airframe structure, considering the relatively large sizes of the individual landing gear units, whereby steps to reinforce the structure must be taken. The conventional spacing for the main frame for such large landing gear units cannot be maintained or if so only conditionally, i.e., there must be bays in, or passages through the main frame so that the required retraction well for the landing gear units can be formed within the outer contour of the aircraft.

As a rule, the size of the landing gear wheels or of the landing gear units requires forming bosses projecting relatively far beyond the actual cross-sectional contour of the fuselage in order to form the retraction wells. Furthermore, expensive displacement means are required to retract the individual landing gear units, whereby again much space is required.

The known landing gears, in which the landing gear units or the landing gear wheels are arranged predominantly across an area extending in the direction of the transverse aircraft axis and with respect to that direction only across a small area in the direction of the aircraft longitudinal axis, do in fact offer advantages as regards taxiing on the ground around curves, for instance with respect to tire abrasion, but the transfer of the occurring stresses into the airframe structure when the airfact rolls on the ground and the supporting of the fuselage over an extensive length create problems. When the aircraft is extraordinarily large both in the transverse and longitudinal directions, the dimensions of the landing gear cannot arbitrarily increase with aircraft size for the purpose of absorbing the stresses that are generated. The expected inert behavior of landing gear wheels of large size, for instance upon landing impact with wheel start by ground contact, sets limits to how much the size can be increased.

It is the object of the present invention to provide a landing gear for aircraft of extraordinary sizes, which for the best possible distributed transfer of the stresses occurring when the aircraft rolls on the ground into the airframe structure results in the least possible encroachment on the airframe structure.

This object is achieved by the invention in that:

(a) a plurality of landing gear units is provided and arranged in two or more rows predominantly distributed in an area at the fuselage extending in the aircraft longitudinal direction, (b) the landing gear units and the main frame belonging to the airframe structure are designed in the manner of a grid division for which between two main frames of the unencroached structure there is mounted the particular landing gear unit of one row which is capable of being retracted into wells between the frames, and (c) all the landing gear units have the same components and dimensions.

On one hand, an advantageous support for the aircraft fuselage and on the other hand a favorable transfer of the landing gear stresses into the airframe structure are made possible by a landing gear designed according to the invention, especially as regards extraordinary aircraft sizes on account of the division of the landing gear into a larger number of identically designed individual landing gear units and their distribution predominantly in a range extending in the longitudinal direction of the aircraft.

The division of the landing gear into a plurality of individual landing gear units in the manner indicated furthermore offers the advantage that the dimensions of the components of the landing gear and of the landing gear wheels themselves in relation to the increase in size of the aircraft compared to aircraft of lesser dimensions permits storage in the least possible space within the extant fuselage contour. The relatively slight bulk of the landing gear units permits storage at least essentially between two particular main frames and encroachment on the frames due to cut-outs, clearances or passageways to achieve a storage space for the retracted landing gear and for housing the supports for the retraction operation are extensively averted.

The main frames furthermore provide favorable hinge means for the individual landing gear units and a simplification as regards wheel suspensions or supports. The division of the landing gear into a plurality of smaller landing gear units arranged in rows predominantly in the longitudinal direction of the aircraft fuselage and with only a low number of landing gear wheels on a common axle is especially advantageous for the individual steering of the landing gear units when the aircraft taxies around curves on the ground. The tire wear due to dragging on the ground is thereby widely reduced.

In addition to the cited advantages, the distribution of the landing gear units in the manner cited requires only small widths for the taxiing or take-off runways, i.e., even aircraft with extraordinary dimensions, for instance with fuselage lengths and spans of about 100 m can operate on present taxiways and runways. This results furthermore in good ground motion stability, and the pitching moments taking place when loading or unloading the aircraft can be neglected.

A further embodiment of the invention provides that the wheel pivot bearings of a row of landing gear units are mounted mutually flush and parallel to the longitudinal aircraft axis and that in every case a bearing-supporting frame of the fuselage structure extends unencroached between the landing gear units.

This arrangement is made possible by the adopted grid division of landing gear units and fuselage structure and permits the advantageous load distribution in the longitudinal direction of the fuselage. Furthermore, a maximum standardization of construction components is achieved thereby. The transfer of the landing gear loads into the fuselage structure, i.e., into the main frame, advantageously takes place tangentially in the region of the externally located frame segments.

The accompanying drawings show one embodiment of the invention, in which:

FIGS. 1a and 1b show the aircraft in conjunction with the aircraft landing gear, in side and front views respectively, and in schematic form, FIGS. 2a and 2b show the landing gear in a preferred arrangement of the landing gear units, in side and top views respectively, also in schematic form, FIG. 3 is a longitudinal section through the aircraft fuselage with details of the aircraft landing gear, and FIG. 4 is a cut-out from FIG. 3 showing the aircraft fuselage in cross-section with details of the supports for the landing gear units.

The jumbo aircraft transport shown in the drawing is designed for a take-off weight in the range of about 1000 tons.

As shown in FIGS. 1a through 2b, the overall aircraft is denoted by 1, the support wing by 2 and the fuselage by 3. The main landing gear 4 is shown divided into two rows A and B of individual landing gear units 8, the rows extending in the longitudinal direction of the aircraft and the landing gear units being spread along the fuselage 3. Each of the landing gear units 8 includes landing gear wheels 8a and 8b respectively which are always mounted in a rotatable manner on a common axle. The landing gear units 8, or the rows A and B thereof, are mounted on either side of the plane of symmetry E—E of the aircraft. When in the extended position, as shown in FIG. 4 by the solid lines, the landing gear units 8 assume a position for which the stresses occurring when the aircraft is rolling on the ground are tangentially transferred into the structure of the fuselage 3, i.e. in line with the direction of the main bulkhead 10.

In the embodiment shown, nine landing gear units 8 per row A and B and one nosewheel landing gear are provided on each side of the aircraft plane of symmetry E—E. The nosewheel landing gear unit is denoted here as 11 for the overall system. The division of the landing gear into individual landing gear units 8 is carried out for the purpose of a distributed absorption of the generated stresses through the structure and across a region which is predominantly in the longitudinal direction of the fuselage. The center of this region X with respect to the longitudinal aircraft direction is located approximately in a transverse plane passing through the center of mass $S_p$ of the aircraft.

All the landing gear units 8 are identical in design and dimensions in the embodiment shown.

Each of the landing gear units 8 includes the landing gear yoke 12, a separately controlled landing gear steering system 13 mounted to the yoke, a landing gear leg 14 and the landing gear wheels 8a and 8b with the common wheel axle 19. A spring shock absorber 16 furthermore is associated with each landing gear unit 8.

The landing gear yoke 12 is designed in the shape of a fork, where the two tines 20 and 20' penetrate support elements 21 for the seating on the airframe structure, i.e. the main frames 10. As shown particularly in FIG. 3, the support elements 21 or the wheel pivot axles 23 and the tines 20, 20' are mounted in a common plane parallel to the aircraft longitudinal axis. A hydraulically actuated operational cylinder 31 is provided to retract the landing gear units 8 for each one thereof; the cylinder rests on one hand on the fuselage structure and on the other hand on the landing gear yoke 12. Furthermore each of the landing gear units 8 is provided with a folding brace 30 between the airframe structure and the landing gear yoke 12, which braces the landing gear in the transverse direction when in the extended position. The retraction wells 28 for the landing gear units 8 are formed between the main frames 10 and can be covered by the cover flaps 29.

It will be obvious to those skilled in the art that many modifications may be made within the scope of the present invention without departing from the spirit thereof, and the invention includes all such modifications.

What is claimed is:

1. In a retractable landing gear for jumbo aircraft, in particular of the high-wing monoplane design, with a number of landing gear units which are individually steerable and are retractable into wells within the aircraft fuselage, the improvement comprising:
(a) means mounting at least three landing gear unit means (8) in each of two or more rows (A, B) along the aircraft fuselage (3), the area (X) of the aircraft extending from a location in front of the center of gravity (SP in FIG. 2a) of the aircraft to a location behind the center of gravity;
(b) main frames (10) belonging to the airframe of the fuselage (3) are distributed in an equidistant grid-like pattern in the area of the landing gear, said frames determining the shape and strength of the fuselage and absorbing the forces;
(c) the main frames (10) are designed without interference with respect to each other and spaces between every two main frames (10) form seating wells (28) for one landing gear unit (8) each, said main frames being free of breaks and cut-outs;
(d) a yoke-member (12) with fork-like support arms (20, 20') is associated to each landing gear unit (8) for the purpose of a pivoting retraction motion,
(e) the main frames (10) support pivot bearings (21, 23) for the yoke members (12), the arms (20, 20') of each yoke member (12) acting on adjoining main frames (10),
(f) the pivot axles (23) of all yoke members (12) of the landing gear units (8) arranged in one row (A or B) are mounted parallel to the longitudinal aircraft axis and flush with each other, and
(g) all landing gear units (8) comprise the same construction components and the same dimensions.

* * * * *